United States Patent [19]

McGuire et al.

[11] 4,333,107
[45] Jun. 1, 1982

[54] JAM-RESISTANT TV SYSTEM

[75] Inventors: Kenyon E. McGuire, Somerville; Stanley S. Brokl, Somerset, both of N.J.

[73] Assignee: RCA Corporation, New York, N.Y.

[21] Appl. No.: 35,771

[22] Filed: May 3, 1979

[51] Int. Cl.³ .............................................. H04N 7/16
[52] U.S. Cl. ................................... 358/120; 358/122; 358/123; 358/148; 358/153; 358/259
[58] Field of Search ............... 358/120, 122, 123, 148, 358/153, 259, 264

[56] References Cited

U.S. PATENT DOCUMENTS

| | | | |
|---|---|---|---|
| 3,780,213 | 11/1973 | Harna | 358/123 |
| 3,916,406 | 10/1975 | Miller et al. | 325/65 |
| 4,075,660 | 2/1978 | Horowitz | 358/120 |
| 4,091,423 | 5/1978 | Branscome | 358/259 |

*Primary Examiner*—S. C. Buczinski
*Attorney, Agent, or Firm*—Samuel Cohen; George J. Seligsohn

[57] ABSTRACT

A jam-resistant TV transmission system including means to transmit a composite video signal in which each vertical sync pulse is replaced by several increasingly-delayed symbols from a pseudo-random number generator. Receiver means includes a correlator which produces a correlation pulse on receipt of a predetermined one of the symbols. The timing of the correlation pulse and the known delay of the predetermined symbol are used to generate reconstituted vertical sync pulses.

10 Claims, 4 Drawing Figures

JAM-RESISTANT TV SYSTEM

The Government has rights to this invention pursuant to Contract No. N00163-78-C-0023 awarded by the Department of the Navy.

This invention relates to television (TV) transmission systems, and particularly to such systems which are relatively resistant to jamming signals intended to interfere with synchronization of the TV display.

In accordance with an example of the invention, a transmitted TV signal has each of the usual vertical synchronizing pulses replaced by several sequential symbols from a pseudo-random number (PN) generator. At the receiver, a predetermined one of the symbols from an identical PN generator is supplied as a reference symbol to a correlator. The correlator receives the several sequential symbols from the transmitter, and produces a correlation pulse when the received symbol matches the reference symbol. Means responsive to the correlation pulse and the known phase delay of the predetermined symbol produce a reconstituted vertical synchronizing pulse having the correct timing.

Figure 1:
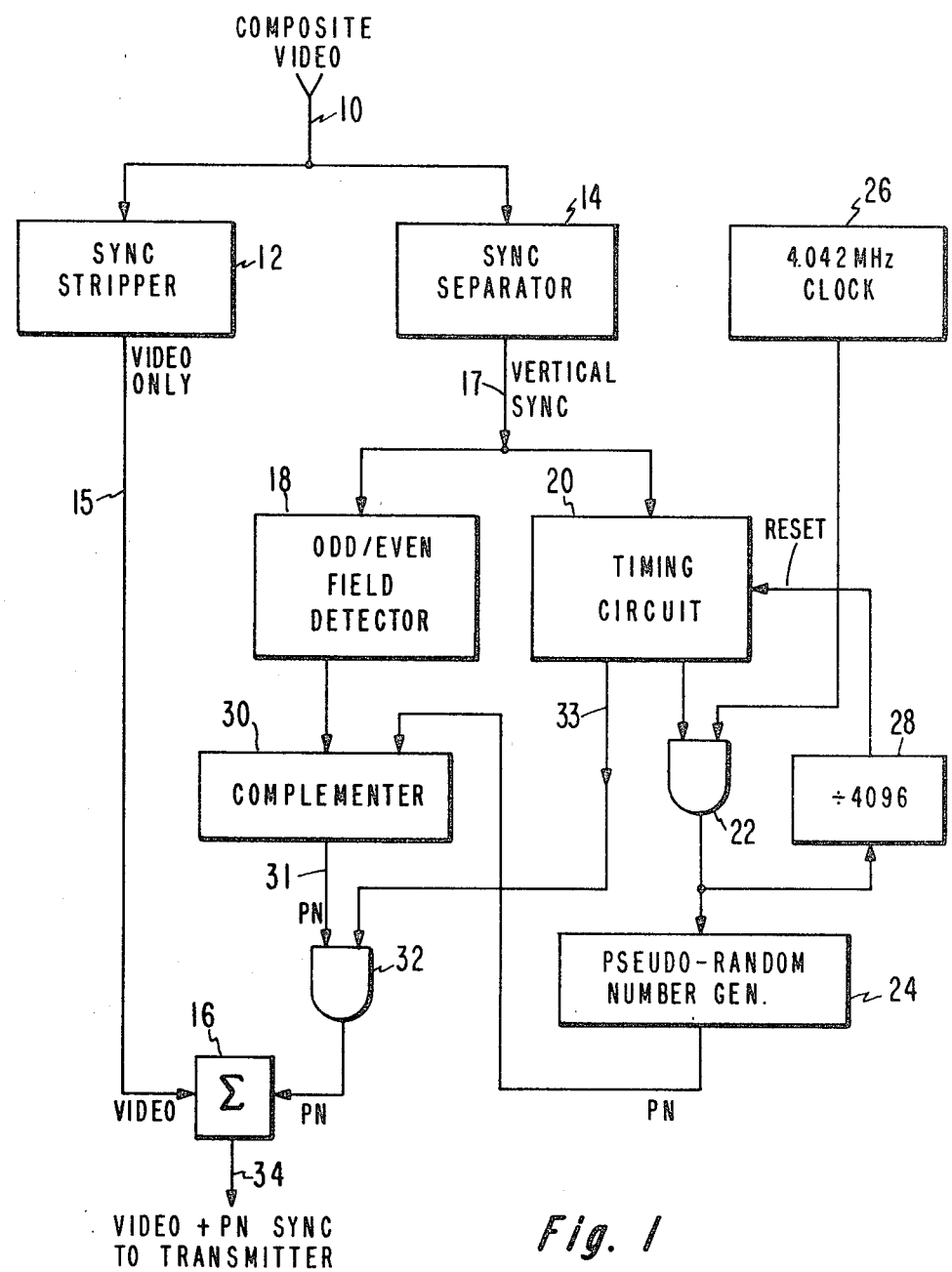
FIG. 1 is a diagram of apparatus at a transmitter for substituting several sequential symbols from a PN generator for the usual vertical synchronizing pulse.

Referring now in greater detail to FIG. 1, a composite video signal from a standard TV camera or other source is applied from input terminal 10 to a standard sync stripper 12 and a standard sync separator 14. The sync stripper 12 strips off the vertical and horizontal synchronizing pulses from the composite input signal and supplies solely the video portion of the signal over line 15 to an input of a summer 16.

The sync separator 14 separates the vertical and horizontal synchronizing pulses from the composite video and applies the separated vertical synchronizing pulses at 17 to an odd/even field detector 18, and to a timing circuit 20 having an output applied through an "and" gate 22 to control the operation of a pseudo-random number (PN) generator 24. The timing circuit enables the "and" gate to pass the output of a 4.042 MHz clock 26 to the PN generator 24. After 4,096 cycles of the 4.042 MHz clock have been applied to the PN generator 24, a divider 28 generates a pulse used to reset the timing circuit 20.

The output of the PN generator 24 is applied to a complementer 30 controlled by the odd/even field detector 18, so that the PN sequence at the output 31 of the complementer has one phase during odd fields of the video signal and the opposite phase during even fields of the video signal, in conformity with broadcast TV standards in the U.S.A. The output of complementer 30 is passed through an "and" gate 32 to the summer 16 when the gate is enabled by a signal over line 33 from timing circuit 20. The enabling signal has a duration starting with the beginning of the vertical sync pulse at 17, and the start of operation of the PN generator 24; and ending after 4096 clocked output pulses from the PN generator 24, as determined by the divider 28. Each sequence of 4096 PN pulses passed by gate 32 is combined in time sequence with one frame of the video signal from sync stripper 12. The output at 34 from the summer is different from the composite video signal at 10 in that each vertical synchronizing pulse, and a large part of each vertical blanking pulse is replaced by a 4096-bit PN sequence.

Figure 4:
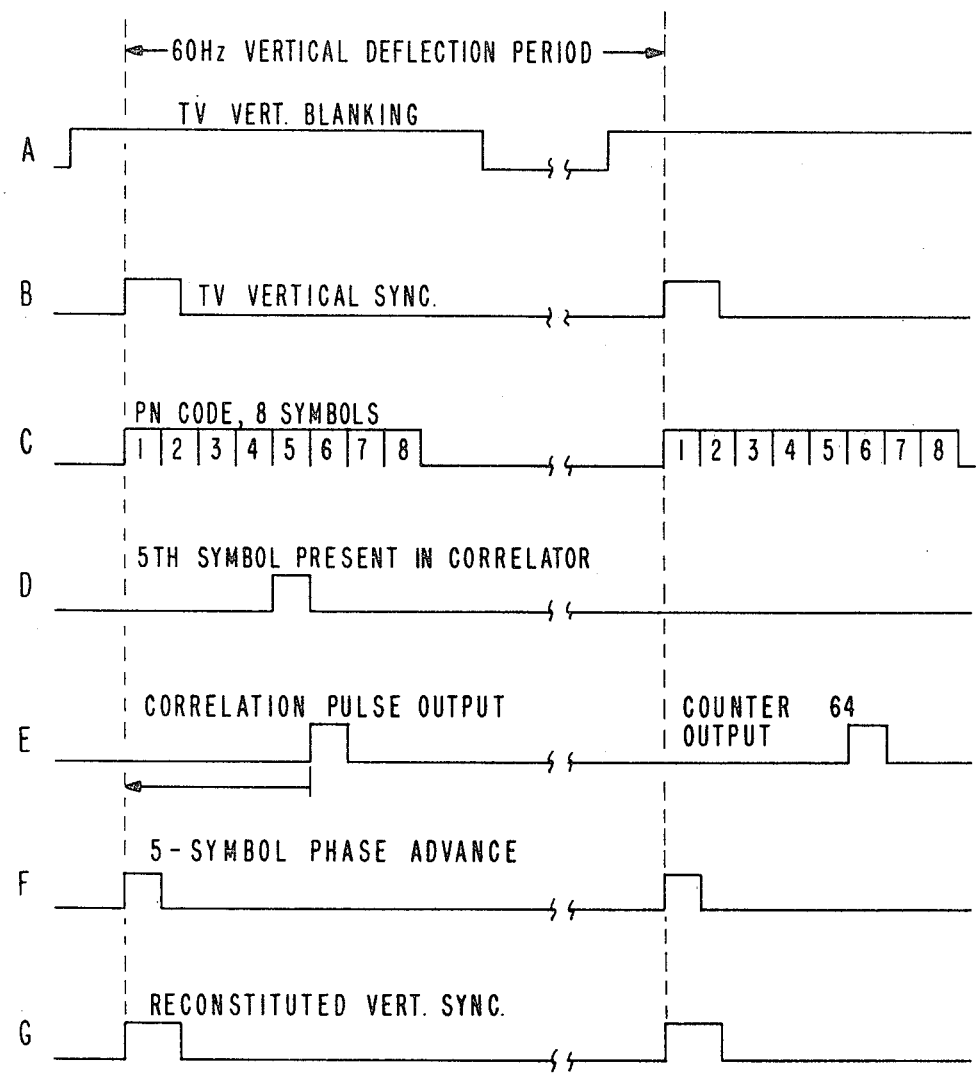
FIG. 4 is a timing diagram which will be referred to in describing the operation of the apparatus of FIGS. 1, 2 and 3.

The time relationships of the composite video vertical blanking pulse, the vertical sync pulse, and the PN code or sequence of pulses are shown at A, B and C of the timing chart of FIG. 4. The PN code at C consists of 4096 serial bits (in the present example) divided into eight sequential symbols of 512 serial bits each. It is seen that the first of the eight symbols starts at the same time as the start of the replaced vertical synchronizing pulse, and that the remaining symbols extend in time through most of the time of the vertical blanking interval. All eight symbols are transmitted, and a predetermined one of the symbols is recognized at a receiver and used for generating reconstituted vertical and horizontal synchronizing pulses.

Figure 2:
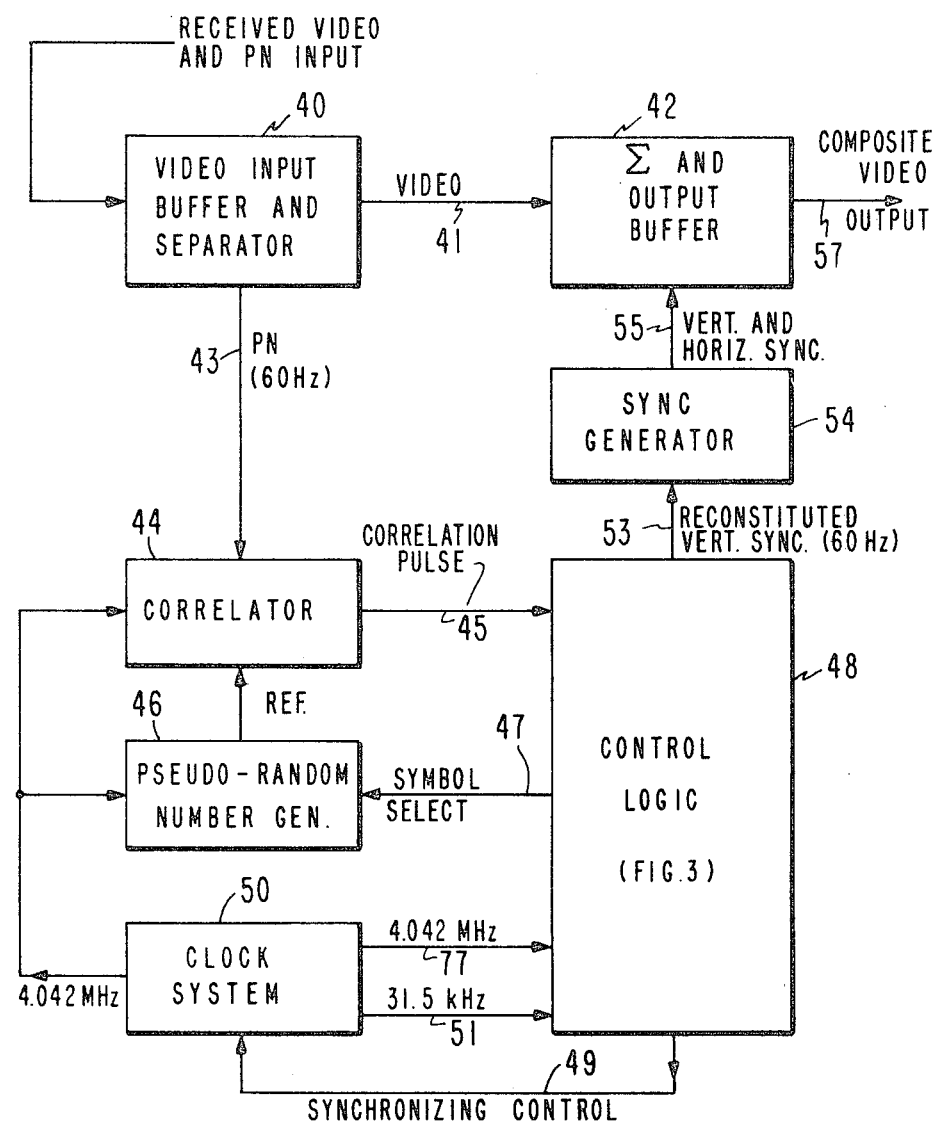
FIG. 2 is a diagram of apparatus at a receiver for identifying the time of arrival of a predetermined one of the symbols, and generating a reconstituted vertical synchronizing pulse having the correct timing.

FIG. 2 shows means at a remote location for receiving the video signal with PN vertical synchronizing code, and generating a composite video signal with reconstituted vertical and horizontal synchronizing pulses. A video input buffer and separator 40 directs the video portion of the received signal to a summer and output buffer 42, and directs the PN sync code to a 512-bit correlator 44. The correlator also receives the 512 bits of one of the eight symbols as a reference from a PN generator 46 that is identical with the PN generator 24 in the transmitter shown in FIG. 1. When the correlator receives a symbol over line 43 which is the same as the reference symbol in the correlator, the correlator produces a correlation pulse applied over line 45 to a control logic unit 48. The control logic unit 48 exerts a control over line 47 which selects one of the eight symbols produced by the PN generator for use as a reference symbol in the correlator 44. The logic unit will be described in greater detail in connection with FIG. 3.

A clock system 50 includes a precision 4.042 MHz clock the same as the transmitter clock 26 in FIG. 1. The clock system 50 and control logic 48 include a known arrangement (not part of the present invention) operative through line 49 for insuring exact synchronism between the transmitter clock and the receiver clock. A 4.042 MHz clock signal is applied from clock system 50 to correlator 44, PN generator 46 and control logic unit 48. In addition, a 31.5 KHz clock signal is applied over line 51 to logic unit 48. The frequency ratio between the 4.042 MHz clock and the 31.5 KHz clock is nominally 128 to 1.

The output on line 53 from the logic unit 48 is a pulse having the timing or phase of the vertical synchronizing pulse in the original composite video input to the transmitter system of FIG. 1. The pulse on line 53 is applied to a conventional sync generator 54, which generates standard TV vertical and horizontal synchronizing pulses, for application over line 55 to the summer and output buffer 42. The summer combines the video received over line 41 with the vertical and horizontal sync received over line 55 and produces on output line 57 a composite video signal which is the same as the composite video signal at the input of the transmitter apparatus of FIG. 1.

Figure 3:
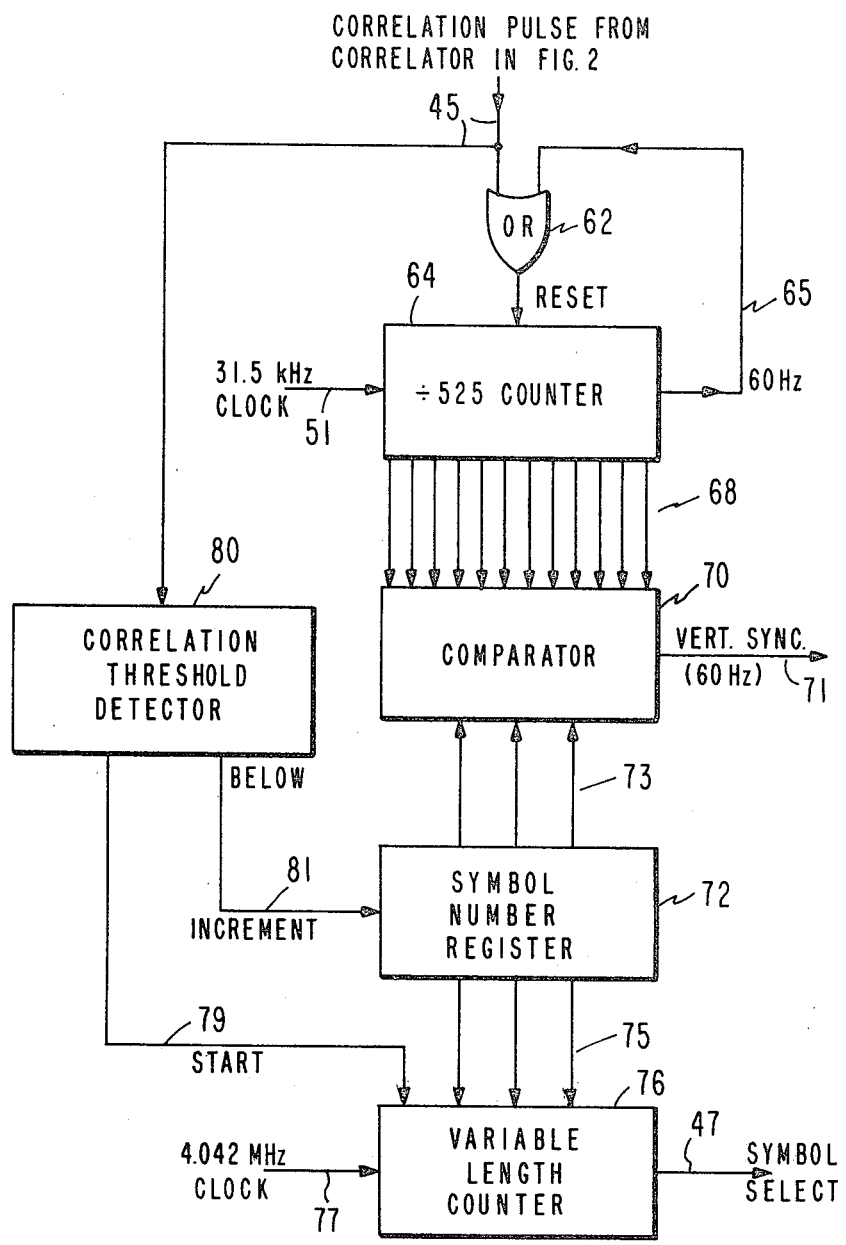
FIG. 3 is a diagram of control logic useful in one block of the apparatus of FIG. 2.

FIG. 3 shows the contents of the control logic unit 48 in FIG. 2. A correlation pulse on line 45 from the correlator 44 in FIG. 2 is applied through an "or" gate 62 to the reset input of a divide-by-525 counter 64 driven by 31.5 KHz clock pulses from the clock system in FIG. 2. As the result of the division, and the resetting of the counter through "or" gate 62, the output at 65 of the counter is a 60 Hz pulse wave having a phase determined by the initially-received correlation pulse. The counter 64 counts pulses from the 31.5 KHz clock and produces an output at 65 every time the count reaches 525. This occurs 60 times per second, which is the field repetition rate of the standard TV display, and is the repetition rate of the vertical synchronizing pulse. The counter 64 counts 32 cycles of the 31.5 KHz clock during the time of the eight-symbol PN code, and counts 4 cycles during each one of the eight symbols.

The ÷525 counter 64 may consist of three Type 74LS163 synchronous counter integrated circuit units manufactured by Texas Instruments Company. The count in the counter 65, represented by the "1" and "0" bits on a plurality of leads 68, is applied to a comparator 70, which may consist of three Type 74LS85 series-connected four-bit comparator integrated circuit units manufactured by Texas Instruments Company.

A three-bit symbol number register 72 contains a number from 1 to 8 representing the predetermined one of the eight PN symbols which is currently used in the system for vertical synchronization. The register 72 may consist of two Type 74191 integrated circuit registers manufactured by Texas Instruments Company. The count in the register 72 is applied over lines 73 to the comparator 70 in a way (to be described) such that, as the counter 64 counts repeatedly to 525, the comparator 70 produces a 60 Hz output at 71 in phase with the vertical synchronizing pulse needed to display the received video signal.

The number in symbol number register 72 is also supplied over lines 75 to a variable length counter 76 which may consist of three Type 74LS163 series-connected four bit integrated circuit counter units manufactured by Texas Instruments Company. The counter 76 is receptive on line 77 to a 4.042 MHz clock signal from the clock system in FIG. 2. The 4.042 MHz clock nominally has 128 cycles during each cycle of the 31.5 KHz clock. The variable length counter 76 has a symbol select output 47 to the PN generator 46 in FIG. 2 to cause the one of the eight symbols from the PN generator, which is identified by the number in the symbol number register 72, to be transferred as a reference symbol to the correlator 44.

The output 75 of the symbol number register 72 is connected to the variable length counter 76 in a manner such that the counter produces an output signal at 47 having a duration from count 0 to one of the eight counts 512, 1024, 1536, 2048, 2560, 3072, 3584 or 4096. This symbol select signal applied to the PN generator 46 in FIG. 2 causes the pseudo-random number produced by the generator to be serially advanced through the 512-bit reference register in the correlator for a length of time such that, at the end of the symbol select signal, the reference register contains the one of the eight symbols specified by the contents of the symbol number register 72 in FIG. 3, as shown in Table A.

TABLE A

| Number in Symbol Number Register 72 | Duration of Symbol Select Signal From Counter 76 |
|---|---|
| 1 | From count 0 to count 512 |
| 2 | From count 0 to count 1024 |
| 3 | From count 0 to count 1536 |
| 4 | From count 0 to count 2048 |
| 5 | From count 0 to count 2560 |
| 6 | From count 0 to count 3072 |
| 7 | From count 0 to count 3584 |
| 8 | From count 0 to count 4096 |

A correlation threshold detector 80 normally receives a correlation pulse over line 45 from the correlator in FIG. 2. If the amplitude of the correlation pulse is below a predetermined threshold because the received signal is being jammed at the time of the symbol being used, the detector 80 produces a signal applied over line 81 to register 72 to increment the number in the register by one. The incremented number is then transferred to the comparator 70 and the variable length counter 76 and the operation of counter 76 is started by a signal over line 79. The resulting new symbol select signal is then applied over line 47 to the PN generator 46 to control the transfer to the reference register in the correlator 44 of the next-higher-numbered 512-bit symbol. Thereafter, the circuit of FIG. 2 uses the new symbol to generate a composite video signal having reconstituted vertical and horizontal synchronizing pulses.

The operation of the system will now be described with references to FIG. 4, which shows at A, B and C, the time relationships during one 60 Hz vertical deflection period of the TV vertical blanking pulse, the TV vertical synchronizing pulse, and the PN code of eight symbols which are transmitted in place of the blanking pulse and the vertical synchronizing pulse. Each of the eight symbols includes 512 serial bits, and all eight symbols transmitted include a total of 4096 serial bits. The 512-bit symbols each have a duration equal to 512 cycles of the 4.042 MHz clock, and the 8-symbol PN has a duration equal to 4096 cycles of the 4.042 MHz clock. Also, each 512-bit symbol has a duration equal to 4 cycles of the 31.5 KHz clock, and the 8-symbol PN has a duration equal to 32 cycles of the 31.5 KHz clock. The period between vertical synchronizing pulses is equal to 525 cycles of the 31.5 KHz clock.

Assume that the number 5 for the fifth symbol is present in symbol number register 72 (FIG. 3) and that the fifth 512-bit symbol is present in the reference register of the correlator 44 (FIG. 2). All eight symbols are received by the video input buffer 40 in FIG. 2 and are serially applied over line 43 to the correlator 44. After the fifth symbol FIG. 4D is received by the correlator, a correlation pulse is generated because the received symbol matches the reference symbol stored in the correlator. The correlation pulse resets the counter 64 in FIG. 3, and thereafter the 60 Hz output at 65 of the counter 64 has the phase shown in FIG. 4E. The circuit of FIG. 3 then operates to generate a 60 Hz vertical sync timing pulse, as shown in FIG. 4F, having the phase of the first symbol in FIG. 4C, which is the same as the phase of the TV vertical sync in FIG. 4B removed from the composite TV signal at the transmitter.

The vertical sync timing pulse is produced at 71 from the comparator 70 every time the count in counter 64 is 505. This is so because the stages of the counter 64 and the stages of the symbol number register 72 (containing symbol number 5) are wired to inputs of the comparator 70 in such a way that a vertical sync timing pulse is produced at output 71 every time the count in counter 64 is 505. Count 505 occurs at the time when a vertical sync pulse should be generated in order that the received video information will be synchronized on the face of a CRT display.

The count is counter 64 which produces an output from comparator 70 depends on the number stored in symbol number register 76, as shown in Table B.

TABLE B

| Symbol Number in Register 72 | Count in Counter 64 Producing Output From Comparator 70 |
|---|---|
| 1 | 525 − 4 = 521 |
| 2 | 525 − 8 = 517 |
| 3 | 525 − 12 = 513 |
| 4 | 525 − 16 = 509 |
| 5 | 525 − 20 = 505 |
| 6 | 525 − 24 = 501 |
| 7 | 525 − 28 = 497 |
| 8 | 525 − 32 = 493 |

It is seen that the comparator 70 responds to the symbol number stored in register 72 and the count in counter 64 to produce an output vertical sync timing pulse at 71 having the phase needed to control the sync generator 54 in FIG. 2 to produce reconstituted vertical and horizontal synchronizing pulses. The resulting synchronizing waveform is combined in summer and buffer 42 to create a composite video output signal at 57.

The operation of the system continues using the symbol the number of which is stored in register 72 for synchronizing the received video signal. If an interfering signal or noise occurs during the time of transmission of the predetermined symbol, the amplitude of the correlation pulse produced by the correlator 44 in FIG. 2 may be below a threshold set into correlation threshold detector 80 in FIG. 3. If so, an output at 81 is applied to increment the number in the symbol number register 72. Thereafter, the variable length counter 76 issues a symbol select signal which causes the newly-identified symbol to be transferred as reference symbol to the correlator 44. The system then uses the new symbol for vertical synchronization until a change is caused by interference with the symbol used, or the number in the symbol number register is changed manually.

The system described operates properly despite interference, unless the entire period of all eight symbols is jammed. Such prolonged jamming is not likely to occur because it requires more power than is apt to be available in the field for the purpose.

What is claimed is:

1. A jam-resistant TV transmission system, comprising
   transmitter means to transmit a composite video signal in which each vertical synchronizing pulse is replaced by a synchronizing signal of several symbols from a pseudo-random number (PN) generator, several symbols occurring with increasing phase delays relative to the vertical synchronizing pulse, and
   receiver means for said transmitted signal, including
   a correlator receptive to said sequential symbols and containing a predetermined one of said symbols as a reference, and producing a correlation pulse when the correlator receives a symbol which is the same as the reference, and
   synchronization reconstituting means responsive to the correlation pulse and the known phase delay of the predetermined symbol in the sequence of symbols to produce a reconstituted vertical synchronizing pulse for synchronizing the received video.

2. A system according to claim 1 wherein said receiver includes a PN generator identical to the one in the transmitter.

3. A system according to claim 2 wherein said receiver includes a symbol number register for the number of the one of the several symbols to be used for vertical synchronization.

4. A system according to claim 3 wherein said receiver includes means responsive to the contents of said symbol number register to load the identified one of the several symbols from said PN generator into said symbols correlator as a reference symbol.

5. A system according to claim 4 wherein said receiver includes means to pass all sequential symbols of a received synchronizing signal through said correlator to produce a correlation pulse when the correlator receives a symbol which is the same as the predetermined reference symbol therein.

6. A system according to claim 5 wherein said synchronization reconstituting means includes means producing a pulse wave having a phase determined by the correlation pulse, and a frequency equal to the vertical synchronizing rate of the TV system.

7. A system according to claim 6 wherein said synchronization reconstituting means includes means responsive to said pulse wave, and to the number in the symbol number register, to produce a reconstituted vertical synchronizing pulse wave having a leading edge corresponding with the leading edge of the first of said received symbols.

8. A system according to claim 7 wherein said synchronization reconstituting means includes a sync generator responsive to said reconstituted vertical synchronizing pulse to produce vertical and horizontal synchronizing signals.

9. A system according to claim 8 wherein said synchronization reconstituting means includes means to combine the received video signal with the output of said sync generator to produce a reconstituted composite video signal.

10. A jam-resistant TV transmission system, comprising
    transmitter means to transmit a composite video signal in which each vertical synchronizing pulse is replaced by a synchronizing signal of several symbols, of n serial bits each, from a pseudo-random number generator, said synchronizing signal starting at the beginning of the replaced vertical synchronizing pulse with a first one of the several successive symbols, and
    receiver means for said transmitted signal, including
    a second identical pseudo-random number generator,
    an n-bit symbol correlator,
    a symbol number register for the number of the one of the symbols to be used for vertical synchronization,
    means responsive to the contents of said symbol number register to load the identified one of the several symbols from said pseudo-random number generator into said n-bit symbol correlator as a reference symbol,
    means to pass all sequential symbols of a received synchronizing signal through said correlator to produce a correlation pulse when the correlator receives a symbol which is the same as the predetermined reference symbol therein, means producing a pulse wave having a phase determined by the correlation pulse, and a frequency equal to the vertical synchronizing rate of the TV system, means responsive to said pulse wave, and to the number in the symbol number register, to produce a reconstituted vertical synchronizing pulse wave having a leading edge corresponding with the leading edge of the first of said received symbols, a sync generator responsive to said reconstituted vertical synchronizing pulse to produce vertical and horizontal synchronizing signals, and means to combine the received video signal with the output of said sync generator to produce a reconstituted composite video signal.

* * * * *